Figure 1:
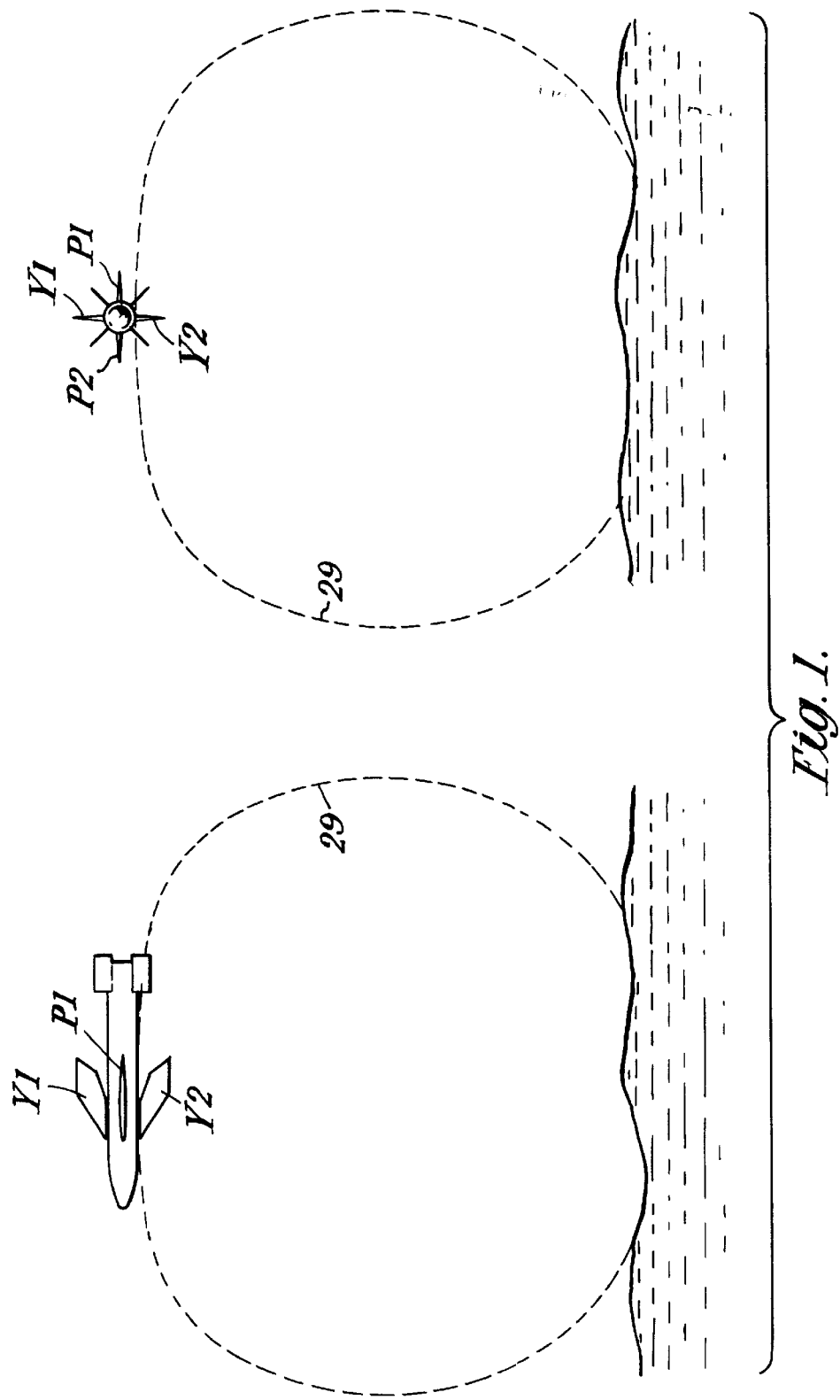

United States Patent [19]

McIlroy

[11] Patent Number: 6,042,049

[45] Date of Patent: Mar. 28, 2000

[54] CONTROL OF THE HEIGHT OF GUIDABLE FLYING BODIES

[75] Inventor: James W. McIlroy, Belfast, United Kingdom

[73] Assignee: Short Brothers PLC, Belfast, United Kingdom

[21] Appl. No.: 05/647,646

[22] Filed: Jan. 9, 1976

[30] Foreign Application Priority Data

Jan. 10, 1975 [GB] United Kingdom .......................... 1151

[51] Int. Cl.[7] ....................................................... F41G 7/00
[52] U.S. Cl. ............................................................. 244/3.14
[58] Field of Search ............................................... 244/3.14

[56] References Cited

U.S. PATENT DOCUMENTS 3,360,215  12/1967  Cohen et al. ........................... 244/3.14
3,695,555  10/1972  Chadwick ............................... 244/3.14

*Primary Examiner*—Charles T. Jordan
*Assistant Examiner*—Theresa M. Wesson
*Attorney, Agent, or Firm*—Pillsbury Madison & Sutro LLP

[57] ABSTRACT

A guidable flying body of the type in which a pitch control signal from a station remote from the flying body is received by the flying body to control the pitch of the flying body. The flying body is provided with height control in which the height of the flying body is sensed from the flying body and, as the flying body approaches a predetermined minimum height, the pitch control signals are so modified after reception by the flying body that the flying body is controlled to maintain at least said predetermined minimum height.

7 Claims, 3 Drawing Sheets

CONTROL OF THE HEIGHT OF GUIDABLE FLYING BODIES

The invention relates to the control of the height of guidable flying bodies.

According to a first aspect of the invention, there is provided a method of controlling the height of a guidable flying body of the type in which a pitch control signal from a station remote from the flying body is received by the flying body to control the pitch of the flying body, the method comprising sensing, from the flying body, the height of the flying body and, as the flying body approaches a predetermined minimum height, so modifying the pitch control signals after reception by the flying body that the flying body is controlled to maintain at least said predetermined minimum height.

Preferably the pitch control signal received by the flying body is a constant maximum downward signal, the method further comprising reducing the maximum downward signal as the flying body approaches said predetermined minimum height until a nett null signal is produced at said predetermined height so that the flying body tends to maintain said predetermined height.

According to a second aspect of the invention, there is provided height control apparatus for a guidable flying body of the type in which a pitch control signal from a station remote from the flying body is received by the flying body to control the pitch of the flying body, the apparatus comprising height sensing means for location on the flying body to sense the height of the flying body and control means which are connected to the height sensing means and which, in use, receive the pitch control signal and, as the flying body approaches a predetermined minimum height, so modifies the pitch control signal that the flying body is controlled to maintain at least said predetermined minimum height.

Preferably, the pitch control signal received by the flying body is a constant maximum downward signal, the control means reducing the constant maximum downward signal as the flying body approaches the predetermined minimum signal height until a nett null signal is produced at said predetermined minimum height so that the flying body tends to maintain said predetermined minimum height.

According to a third aspect of the invention there is provided a wing for a guidable flying body having height control apparatus according to the second aspect of the invention mounted thereon.

According to a fourth aspect of the invention, there is provided a roll stabilised guided missile including height control apparatus according to the second aspect of the invention or including a wing according to the third aspect of the invention.

Figure 2:
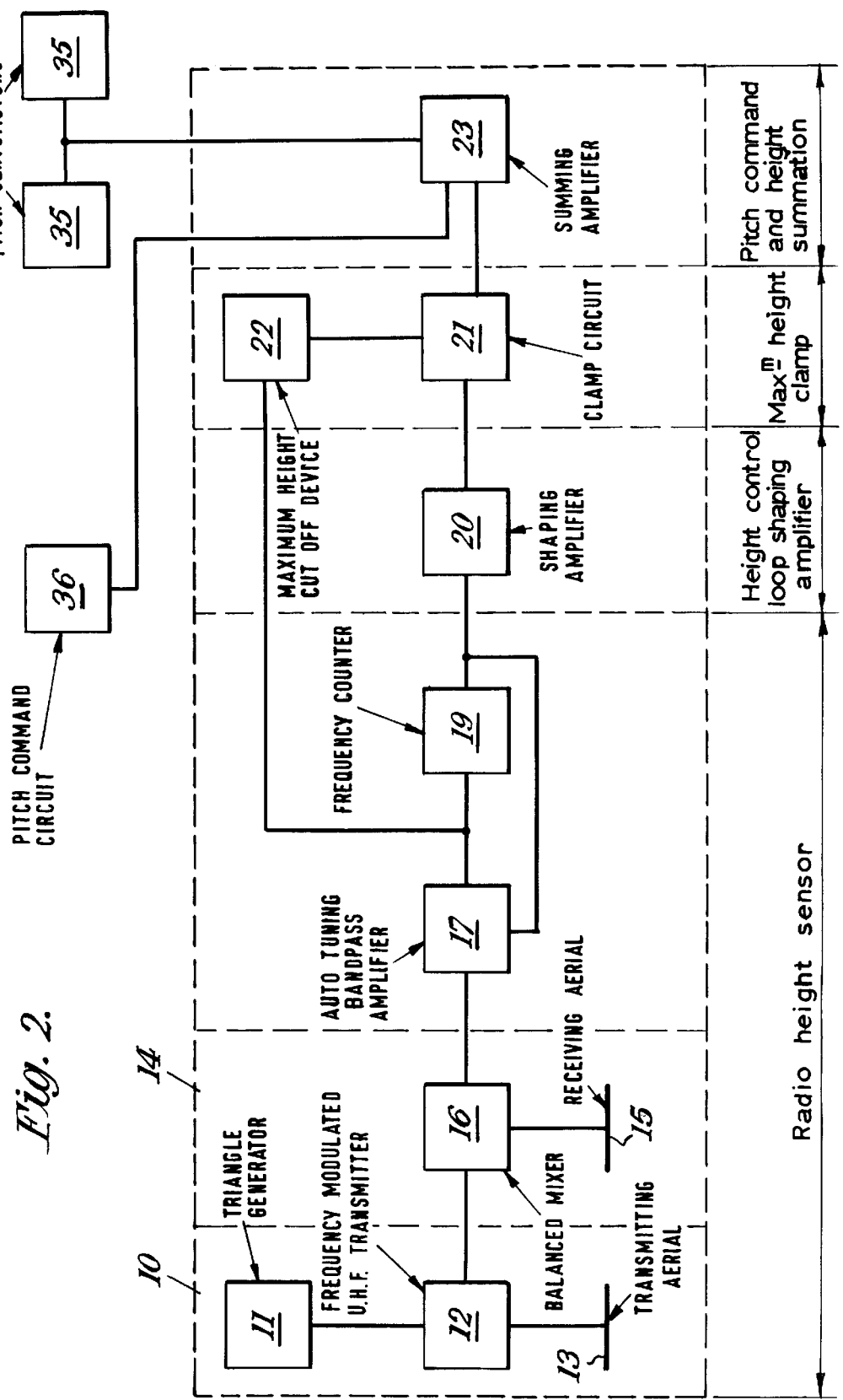
Figure 3:
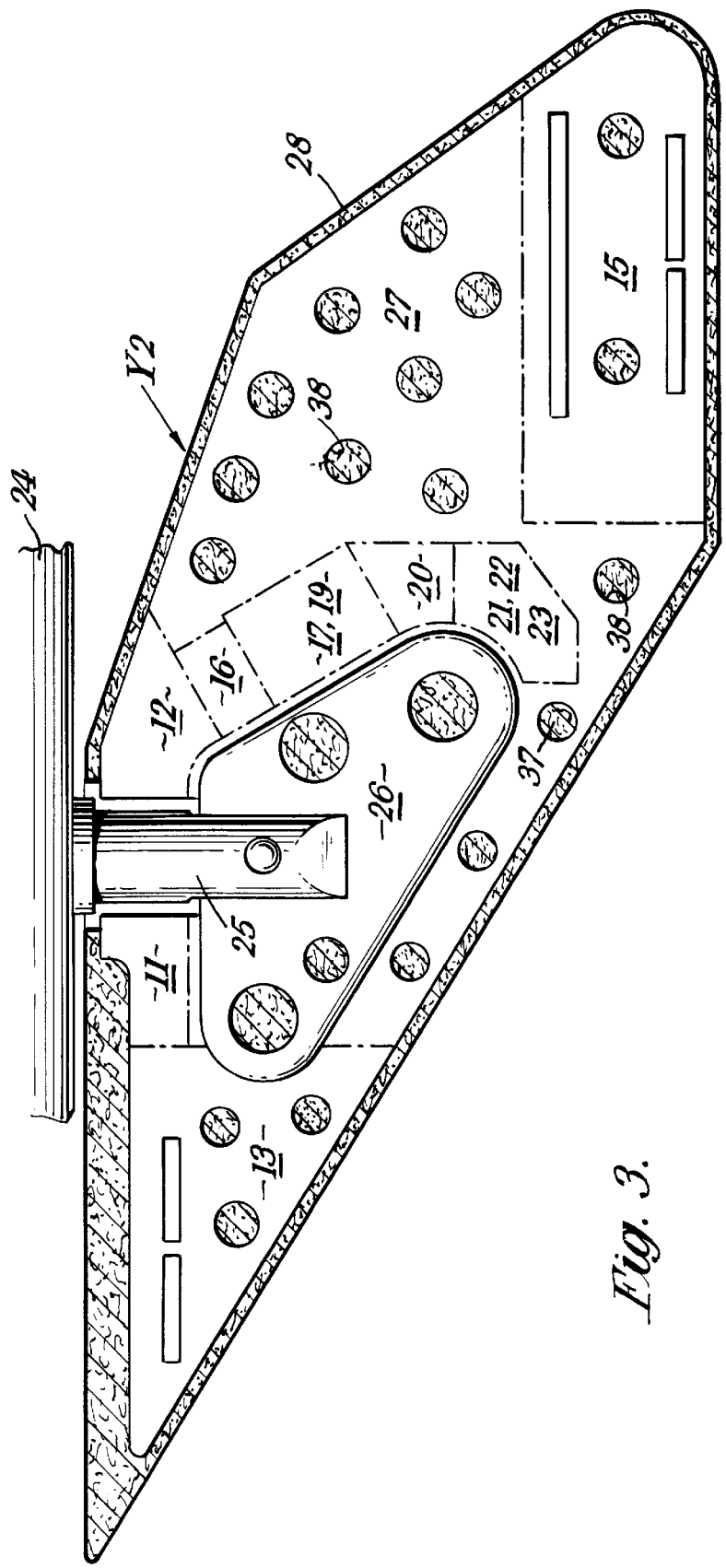

The following is a more detailed description of one embodiment of the invention, by way of example, reference being made to the accompanying drawings in which:

FIG. 1 shows a side elevation and an end elevation of a guided missile flying over a sea surface, FIG. 2 shows a block diagram of height control apparatus of the missile of FIG. 1, and FIG. 3 shows the disposition of the height control apparatus of FIG. 2 on a wing of the guided missile of FIG. 1.

Referring first to FIG. 1, the missile is of the roll stabilised type and includes a guidance system 36 (see FIG. 2) which receives pitch and yaw control signals from a ground command station (not shown). The pitch control signals operate the pitch wings P1, P2 by means of pitch servos 35 (see FIG. 2) and the yaw control signals operate the yaw wings Y1, Y2 by means of yaw servos (not shown) to guide the missile to a target.

Referring next to FIG. 2, the height control apparatus comprises a transmitter unit 10 which includes a triangle generator 11 whose output signal modulates the frequency of an ultra high frequency transmitter 12 whose output is fed to a low gain dipole transmitting aerial 13. A receiver unit 14 is located adjacent the transmitter 10 and comprises a low gain dipole receiving aerial 15 connected to a balanced mixer 16. The ultra high frequency transmitter 12 has a second output connected to the balanced mixer 16.

The output of the balanced mixer 16 is fed to an auto-tuning band pass amplifier 17, one output of which amplifier is fed to a maximum height cut-off device 22, and the other output of which is fed to a frequency counter 19 whose output is fed back to the band pass amplifier 17.

A shaping amplifier 20 receives signals from the frequency counter 19 and feeds signals to a clamp circuit 21. The maximum height cut-off device 22 receives signals from the band pass amplifier 17 and controls the clamp circuit 21. A summing amplifier 23 receives the output from the clamp circuit 21 and also the pitch control signals from the guidance system 36 of the missile. The output of the summing amplifier 23 is fed to the missile pitch servos 35.

Referring next to FIG. 3, there is shown one form of mounting of the height control apparatus on the guided missile. The apparatus is mounted on the underneath yaw wing of the missile Y2. The wing Y2 is connected to the missile body 24 by a rotatable hollow stub 25 through which all electrical connections pass. The stub 25 is pinned to an alloy palm 26 and carries a printed circuit board 27 on which is etched the circuits of the triangle generator 11, the ultra high frequency transmitter 12, the printed transmitter aerial 13, the receiving aerial 15, the balanced mixer 16, the band pass amplifier and frequency counter 17, 19, the shaping amplifier 20 and the maximum height cut-off device, clamp circuit and summing amplifier 21, 22, 23. The printed circuit board 27 is formed with holes 38. A glass fibre skin 28, covers the wing and the circuits and is foam filled with the foam 37 keying to the wing Y2 through the holes 38.

In use, the missile is fired from a ship towards a target across water. A constant D.C. maximum downward pitch signal is sent to the missile from the ship and the missile is steered, in yaw, by an operator, from the firing ship, who guides the missile towards the target. The constant D.C. maximum downward signal reduces the height of the missile until the missile approaches a height above the sea which is unsafe due to the likelihood of the missile contacting waves or other obstacles. The constant D.C. maximum downward command signal received by the missile from the guiding ship is backed off by the height control apparatus described above as the missile descends until a predetermined minimum safe height is reached when the pitch wings P2 are brought to zero angle and the missile height is stabilised at the predetermined minimum height. This is achieved in the following manner:

The triangle generator 11 generates a triangular wave of low frequency, for example 500 Hz., which frequency-modulates the ultra high frequency signal (which is in the band $3 \times 10^8$ to $3 \times 10^9$ Hz) of the transmitter 12. The transmitting aerial 13 gives an effective beam width of approximately 90° solid angle. This produces a polar diagram substantially as shown in broken line at 29 in FIG. 1.

The signal is reflected from the sea surface which provides a base for the measurement of the predetermined height. The reflected signal is detected by the receiving aerial 15. The received signal passes to the balanced mixer 16 together with a signal representing the output of the transmitter 12. The instantaneous frequencies received by the balanced mixer 16 will differ in frequency by an amount proportional to the propogation delay to and from the sea surface. Since this delay is proportional to the height of the missile above the sea, a difference or beat frequency signal produced by the balanced mixer 16 will also be proportional to the missile height. For example, if the triangle frequency is 500 Hz, the transmitter frequency $10^9$ Hz and the height of the missile above the sea 5 ft., then the beat frequency signal will be approximately 1,000 Hz.

The receiving aerial 15 also receives the transmitted signal directly from the transmitting aerial 13 and this produces a beat frequency signal. The band pass amplifier 17 has a pass band which includes the beat frequencies produced by the reflected signals but will not pass the beat frequencies produced from the directly transmitted signal. The band pass amplifier 17 is auto tuning and, after the output therefrom has been passed through the frequency counter 19 to convert linearly the reflected beat frequency signal into a D.C. voltage proportional to missile height, this D.C. voltage is fed back to the band pass amplifier 17 to tune it to have a pass band which is optimum for the reflected beat frequency signal. In addition, the band pass amplifier 17 is designed such that it will not tune down to the direct beat signal frequency or its low harmonics and has a "Q" factor sufficient to allow initial acquisition of any desired beat frequency.

The D.C. voltage produced by the frequency counter 19 passes to the shaping amplifier 20 which has a gain/frequency characteristic suitably shaped by resistor/capacitor networks to give optimum control loop response relative to the missile characteristics. The amplified D.C. voltage, which is of opposite sign to the constant D.C. downward signal, passes from the shaping amplifier 20 to the clamp circuit 21. The clamp circuit 21 is controlled by the maximum height cut-off device 22 which receives a signal directly from the output of the band pass amplifier 17.

As the height of the missile rises, the signal received by the receiving aerial 15 becomes weaker and so decreases in amplitude that not every beat will be produced. Thus, the frequency of the signal is no longer sufficiently accurate as a measure of missile height. However, the amplitude of the beat frequency signal is a function of the missile height and an average value of the beat frequency signal amplitude over a few cycles can be used as a measure of the height of the missile.

In operation, therefore, the varying beat frequency signal caused by changes in the height of the missile is conveyed to a peak rectifier included in the maximum height cut-off device 22 which will only pass a signal when the amplitude beat frequency of the signal is above a predetermined level. When this level is exceeded as the missile height decreases, the output from the rectifier passes to a voltage comparator and turns on the voltage comparator to close a transistor switch (not shown) in the clamp circuit 21. However, as the height of the missile increases, the beat frequency signal amplitude decreases, and eventually at a maximum height level pre-set on the voltage comparator, the rectifier output will not be sufficient to hold on the comparator and thus the clamp switch will be opened. This ensures that if the reflected signal is too weak, no signals are passed to the summing amplifier 23, thus avoiding ambiguous height readings and preventing noise passing to the summing amplifier 23.

If the clamp circuit 21 is in a condition in which the D.C. signal can pass, the D.C. signal from the shaping amplifier 20 passes to the summing amplifier 23. This summing amplifier 23 also receives the constant D.C. maximum downward signal from the guidance system 36. The output from the summing amplifier 23 passes to the missile pitch wing servos 35 to alter the pitch of the missile. Where there is a D.C. voltage entering the summing amplifier 23, the normal pitch command line is broken and the constant D.C. maximum downward signal from the guidance system is summed with the D.C. voltage. The modified signal is then applied to the missile pitch servos 35. The characteristics of the shaping amplifier 20 are such that at the predetermined minimum height of the missile, the magnitude of the D.C. voltage is equal to the magnitude of the constant D.C. maximum downward pitch control signal, but is of opposite sign. Thus, at the predetermined height a nett null pitch control signal is produced. Thus the missile tends to maintain the predetermined minimum height.

Because of the broad polar diagrams of the transmitted signal, the height control apparatus may be regarded as creating a cushion below the missile which is insensitive to large changes in missile attitude and also tends to average out small rapid height changes due to -the rough surface of the sea. The fixed inter-relationship of the parts on the printed circuit board 27 ensures that the direct beat frequency signal generated is of constant frequency and thus can be easily accounted for in the band pass amplifier 17.

The use of a frequency modulated signal as a height sensor has a minimum height and fixed or step error inversely proportional to the modulation deviation of the transmitter frequency, i.e. the greater the deviation the smaller the minimum height and fixed error. For this reason, a large deviation (for example 100 MHz peak to peak) is used and is readily accommodated by the large band width of the simple aerials. Normally, a large deviation is only practicable at micro-wave frequencies.

What we claim is:

1. A guidable flying body including height control apparatus for a guidable flying body comprising:
   (a) pitch control means for controlling the pitch of said flying body,
   (b) a guidance system for receiving pitch control signals transmitted to said flying body from a station remote from said flying body,
   (c) height sensing means for sensing in said flying body the height of said flying body and producing a sensed height signal corresponding to the sensed height of said flying body, and
   (d) control means which receive the pitch control signals from the guidance system and receive the sensed height signal and which produce therefrom a modified pitch control signal when said flying body approaches a predetermined minimum height, said modified pitch control signal passing to said pitch control means to maintain said flying body at, at least, said predetermined minimum height.

2. A flying body according to claim 1 wherein the pitch control signal received by the guidance system is a constant maximum downward signal, the control means reducing the constant maximum downward signal with the sensed height signal as the flying body approaches the predetermined minimum height until a nett null signal is produced at said predetermined minimum height whereby the flying body tends to maintain said predetermined minimum height.

3. A flying body according to claim 1 wherein the height sensing means comprises a transmitter for transmitting a frequency modulated signal from the body and a receiver for receiving the frequency modulated signal reflected from a base above which said predetermined height is measured and wherein the height sensing means produces a beat frequency signal from the transmitted and received signals, the beat frequency signal being representative of the height of the flying body.

4. A flying body according to claim 1 wherein the guidable flying body is guided in pitch by two pitch wings mounted on opposite sides of an exterior surface of the flying body, the wings moving relatively to the body to control the pitch of the flying body and wherein, the control means send the modified pitch control signal to servo motors associated with the two wings to move the wings.

5. A flying body according to claim 3 wherein the transmitter comprises a transmitting aerial and the receiver comprises a receiving aerial located adjacent the transmitting aerial, the height sensing means comprising a band pass filter for filtering the received signal to remove beat frequency signals generated by direct reception of the transmitted signal by the receiving aerial.

6. Apparatus according claim 3 wherein a clamp device is provided between the height sensing means and the control means, the clamp device receiving the beat frequency signal and, at a predetermined maximum height of the flying body, disconnecting the height sensing means and the control means so that the received pitch control signal is unmodified.

7. A flying body according to claim 3 wherein the downward signal is a D.C. signal wherein the height sensing means includes a frequency counter for converting the beat frequency into a D.C. signal representative of the height of the flying body, and wherein a shaping amplifier is connected between the frequency counter and the control means for shaping the D.C. height signal from the frequency counter so that, when said D.C. downward signal is a maximum, the magnitude of the D.C. signal passing to said control means is the same as the D.C. maximum downward pitch control signal and of opposite sign, the control means summing the D.C. pitch control signal and the D.C. signal to produce a nett null signal.

\* \* \* \* \*